April 21, 1964  C. M. SWEET  3,129,735
CUTTING WOOD BY THE FORMING PROCESS
Filed Nov. 21, 1960　　　　　　　　　　　　　　2 Sheets-Sheet 1
FIG. 1　　FIG. 2　　FIG. 3　　FIG. 4
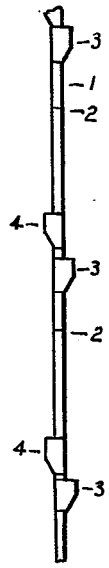 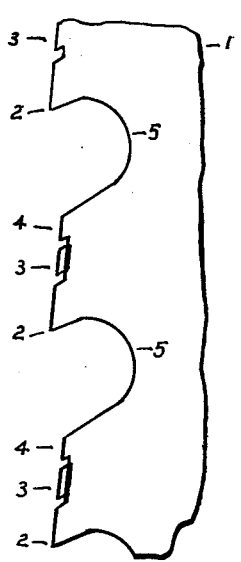 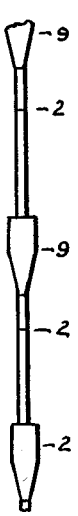 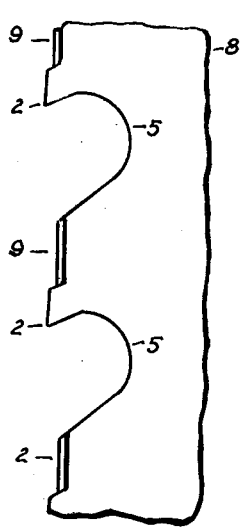
FIG. 5　FIG. 6　　FIG. 7　　FIG. 8　FIG. 9
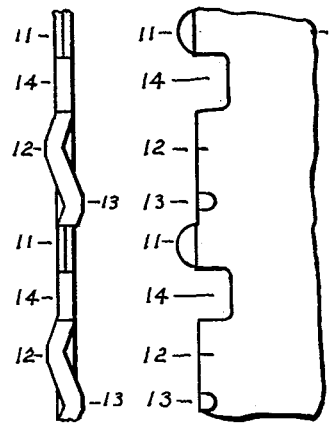 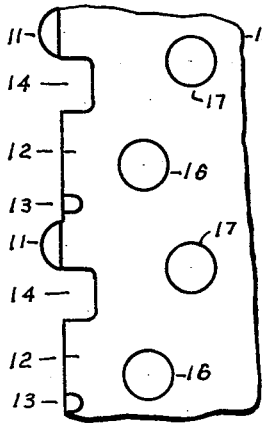 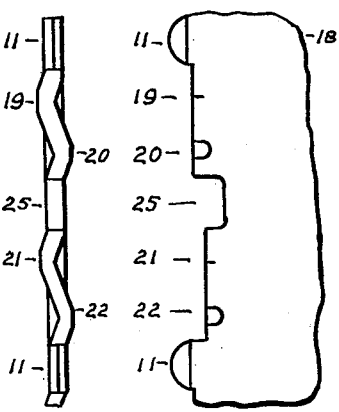
FIG. 10　　FIG. 11
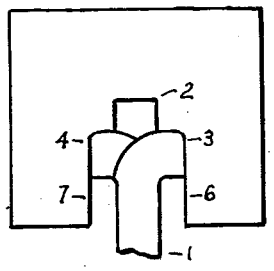 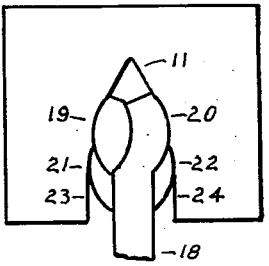
INVENTOR.
Corliss M. Sweet
BY April 21, 1964  C. M. SWEET  3,129,735
CUTTING WOOD BY THE FORMING PROCESS
Filed Nov. 21, 1960  2 Sheets-Sheet 2

INVENTOR.
BY Corliss M. Sweet

United States Patent Office 3,129,735
Patented Apr. 21, 1964

3,129,735
CUTTING WOOD BY THE FORMING PROCESS
Corlise M. Sweet, 1000 E. Montana St., Milwaukee, Wis.
Filed Nov. 21, 1960, Ser. No. 70,474
1 Claim. (Cl. 143—133)

This invention shows a new method of cutting wood by compressing it.

In patent application Number 848,452, filed October 23, 1959, and application Number 17,400, filed March 24, 1960, now abandoned, it was shown how wood could be cut with less saw dust waste and how a better surface finish could be obtained.

This invention takes advantage of the fact that wood can be compressed and when it is compressed it will stay in the compressed shape. The reader can easily prove that by bearing down on a sharp pointed lead pencil that is being used to draw a line on a piece of soft wood such as pine. After the line is drawn it will be observed that the lead pencil point made a groove in the wood that would be deep enough to provide clearance for one side of a narrow saw blade.

It is therefore an object of this invention to show saws that will provide clearance for the blade by forming the the wood and thus reduce the amount of saw dust waste that conventional saws must cut to provide the proper clearance.

Another object is to show blades with knife shaped teeth to cut the wood and other teeth to form the wood and in so doing still further reduce the amount of saw dust waste.

A further object is to show that by cutting less saw dust the gullets in the blade can be smaller which will reduce the thickness of the blade and allow the blade to be used on band mills that have smaller diameter wheels that will be cheaper to purchase, easier to move from one sawing location to another, and can be used in tandem on resawing operations.

Another object is to show that by heating the blade the wood can be cut and formed easier than when it is cold.

Another object is to show that the blade will cut when moving forward or backward and in so doing simplify the conventional reciprocating gang saw that now retracts the blade on the backward stroke of the saw.

A further object is to show that by compressing the wood a better surface finish is obtained than is usually obtained by saws having large teeth.

In the drawings:

FIGURE 1 is a schematic view of the edge of a saw blade showing the tapered teeth that protrude from the side of the blade to compress the wood.

FIGURE 2 is a schematic side elevation of the blade shown in FIGURE 1 looking at it from the right side showing the cutting teeth, the teeth that compress the wood, and the gullets.

FIGURE 3 is a schematic edge view of a saw blade showing swaged tapered teeth that protrude from the side of the blade to compress the wood.

FIGURE 4 is a schematic side elevation of the blade shown in FIGURE 3 looking at it from the right hand side showing the teeth that cut the wood, the teeth that compress the wood, and the gullets that carry away the saw dust.

FIGURE 5 is a schematic edge view of a blade that has knife shaped teeth to cut the wood and wave shaped teeth to compress the wood and provide clearance for the blade.

FIGURE 6 is a schematic side elevation of the blade in FIGURE 5 looking at it from the right hand side showing the curved knife shaped teeth to cut the wood, the teeth that compress the wood to provide clearance and the small gullets to carry out the saw dust.

FIGURE 7 is a schematic side elevation of a blade similar to FIGURE 6, the difference is that holes have been added to carry out any small pieces of wood that may break off and lodge on the sides of the blade.

FIGURE 8 is a schematic edge view of a blade having knife shaped teeth to cut the wood and wave shaped teeth located at different distances from the plane cut by the knife shaped teeth.

FIGURE 9 is a schematic side elevation of the blade shown in FIGURE 8 looking at it from the right hand side, showing the forming teeth located at different distances from the plane cut by the knife shaped teeth.

FIGURE 10 is a schematic view showing a block of wood with the blade shown in FIGURES 1 and 2 engaged in cutting a groove in the wood with the cutting teeth and compressing the sides of the groove with forming teeth that protrude from the sides of the blade.

FIGURE 11 is a schematic view of a block of wood being cut with the blade shown in FIGURES 8 and 9 in which the knife shaped teeth are slicing the wood to form a triangular groove, and the teeth on the sides of the blade are curved and project out at different distances from the blade to provide a means of gradually compressing the wood to provide space for the blade to pass through the wood.

Figure 12:
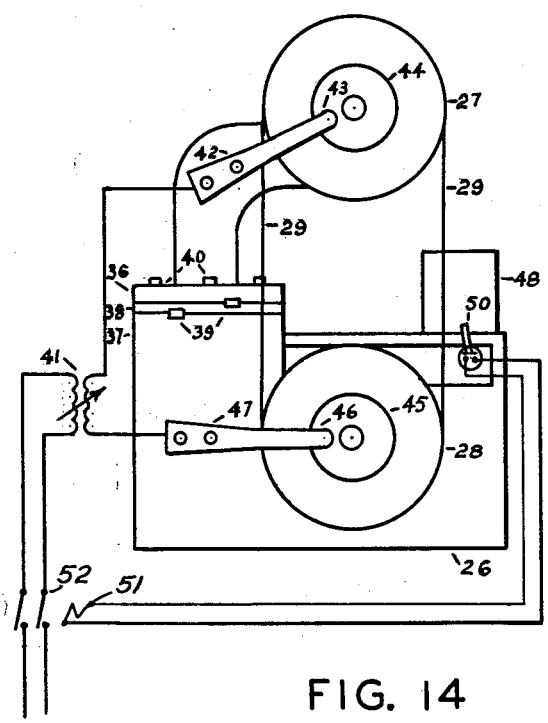
FIGURE 12 is a schematic side elevation of a bandmill that has an electric transformer that heats the blade.

In the construction shown in FIGURES 1 and 2 the blade 1 has teeth 2 that are shaped similar to conventional saw teeth before they are swaged wider than the blade. Teeth 2 cut a groove in the wood. Teeth 3 and 4 compress the wood in the groove cut by the teeth 2. The gullets 5 collect the saw dust and carry it out of the groove or kerf that the blade cuts in the wood.

This can be better understood by referring to FIGURE 10 which shows the groove being cut by teeth 2 and the sides of the grooves 6 and 7 formed by the teeth 3 and 4.

It will be noted that the front part of the forming teeth 3 and 4 in FIGURE 1 have a sloping surface that gradually compresses the wood. The teeth are shown in exaggerated size so that it will be understood that the wood must be gradually compressed. If there is no taper the teeth 3 and 4 will make saw dust by breaking off small pieces of wood. The teeth also must be very smooth so there is as little friction as possible. Any great amount of friction will break off the wood instead of forming and compressing it.

The back part of teeth 3 and 4 are small and parallel with the sides of the blade. These sections should be as small as practical. The reason being that when they are too large they exert a large friction force that makes it difficult to pull the blade through the groove.

The blade in FIGURES 1 and 2 will not require as large gullets as the conventional saw. In the conventional saw the tips of the teeth are swaged approximately twice as wide as the blade thickness. In this blade the teeth are not swaged and for that reason they will not cut as much saw dust. This allows the gullets to be made smaller.

The gullets being smaller, the distance from the tips of the cutting teeth 2 to the bottom of the gullet 5 can be smaller in this saw than in conventional saws. The tooth height being smaller the thickness of the blade can be reduced. Reducing the thickness of the blade the band mill wheels that the blade is mounted on can be smaller in diameter. Making the wheels smaller in diameter the band mill will cost less and it being smaller it can be more easily moved from one sawing location to another. A smaller band mill will also make it easier to place several band mills in tandem for resawing operations.

The teeth 3 and 4 also act as bearing surfaces to make the tooth point 2 cut where it should. In the conventional saw there are no bearing surfaces to make the tooth cut where it should cut. If at any time the teeth in the conventional saw become dull on one side, or they come in contact with a knot the tendency is for the saw to lead, which means the saw cuts more on one side than on the other and the result is a crooked board. In this saw the teeth 3 and 4 bear against the wood and support the tip of teeth 2.

The saw shown in the construction in FIGURES 3 and 4 is similar to the saw shown in FIGURES 1 and 2. It has a blade 8 on which teeth 9 have been swaged. Swaged teeth are more difficult to make than the bent teeth shown as 3 and 4. The swaged teeth have the advantage that opposite sides of the teeth compress the wood. The length of the teeth can taper slightly with the plane connecting the tops of the teeth 2. This will cause the forming teeth 9 to pull the blade into the wood, and the blade can be narrower as not as much beam strength will be required to force the teeth into the wood.

In the construction shown in FIGURES 5 and 6 the blade 10 has knife shaped teeth 11 that make a knife cut in the wood. The knife cut is then formed to a wider width by the forming teeth 12 and 13. The teeth 12 and 13 are formed on the edge of the blade in a wave shape. This wave shape provides a strong and smooth surface for the blade to compress the wood. The blade can be used on a bandmill or on a reciprocating saw such as a gang saw. When the blade is used on a reciprocating saw it has the advantage that it can cut in both directions. This will simplify the reciprocating saw as the blade will cut in both directions and does not have to be moved away from the surface being cut on the backward stroke of the blade.

The blade 10 has small gullets 14 that take small pieces of wood out of the groove that break off in the cutting operation. This breaking off of the wood is caused by any excess friction that breaks the outside layer of wood away from the layer below it. For that reason all tooth surfaces should be as smooth as possible. The gullets 14 being small in comparison with conventional saws the blade can be thinner. A thin blade does not cut such a wide groove in the wood and it can be used on band mills having smaller diameter wheels.

The blade 15 shown in FIGURE 7 is similar to the blade shown in FIGURE 6. The difference being that it has holes 16 and 17 in the sides of the blade. The holes pick up any saw dust that lodge between the blade and the wood and carries the saw dust out of the kerf. This reduces the clearance required between the blade and the wood and allows cutting a thinner kerf.

The blade 18 shown in FIGURES 8 and 9 is similar to the blade shown in FIGURE 6, the difference being that it has forming teeth at different distances from the plane cut by the knife teeth 11. Teeth 19 and 20 are closer to the plane cut by knife teeth 11 than are teeth 21 and 22. This can be seen in FIGURE 11. In FIGURE 11 the knife teeth 11 cut a triangular groove in the wood. The teeth 19 and 20 widen the groove cut by knife teeth 11. The groove formed by teeth 19 and 20 is still further widened by the teeth 21 and 22 to form surfaces 23 and 24. The advantage to this is the groove is widened in smaller steps which on some wood will reduce the tendency to break small pieces of wood away from the surface being formed.

The blade 18 has gullets 25 that are similar to the gullets 14 in the other blades.

In the cutting of wood it is much easier to cut when the blade is hot than when the blade is cold. The reason for this is that wood loses it's strength as the temperature increases. It has been reported that for each degree Fahrenheit rise in temperature wood loses ½ to ⅓ of one percent of it's strength. It is also well known that when wood is raised to the temperature of boiling water it is much easier to bend than when it is cold. Decreasing the strength of wood by heating will allow the use of duller blades and narrower blades.

For the above reason there is an advantage to heating the blade. In a band mill this could be done by placing heating coils close to the wheels the blade is mounted on, by applying a flame directly to the blade and wheel, or by insulating the band mill wheels from each other and transmitting an electric current from one wheel to another by means of the blade and in so doing heat the blade.

Figure 13:
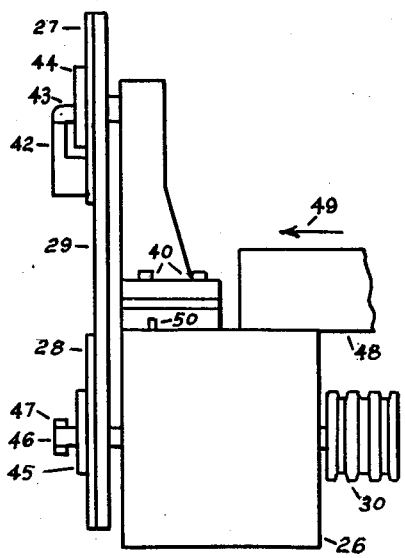
FIGURE 13 is a side elevation of FIGURE 12, looking at FIGURE 12 from the right side.
Figure 14:
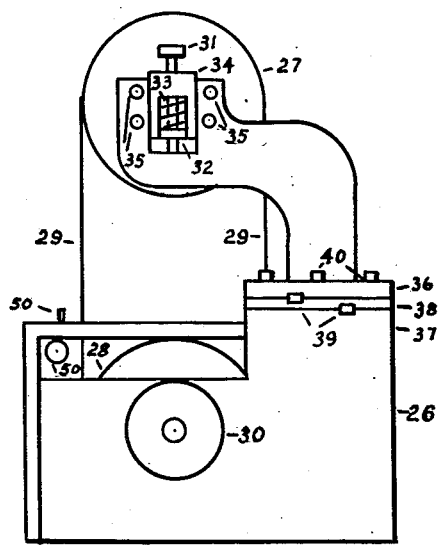
FIGURE 14 is a side elevation of FIGURE 13 looking at FIGURE 13 from the right side.

FIGURES 12, 13, and 14 illustrate how a band saw blade can be heated by transmitting electric current from one wheel to another. Item 26 is a band mill that has an upper wheel 27 and a lower wheel 28 on which a band saw 29 is mounted. The lower wheel 28 is driven by a V belt pulley 30 that is driven by V belts and a motor not shown. The upper wheel 27 can be adjusted vertically with the screw 31 that revolves in nut 32. A spring 33 is located between the nut 32 and the slide 34 on which the wheel 27 is mounted. The purpose of the spring is to maintain a uniform tension load on the blade 29. The wheel 27 can be tipped a small amount with the screws 35 that act on the tenon on the slide 34. All the above parts, and parts that serve the same purpose, have been used on band mills in the past.

The band mill 26 is different from present band mills in that the upper section 36 is separated from the lower section 37 by a part 38 that is made of a fiber material that does not conduct electricity. The part 38 is held in position by keys 39. Part 36 is held down by bolts 40 that are made of a material that does not conduct electricity or they can be standard bolts that have washers made of a non-conducting material that are placed between the bolt head and the part 36.

The blade is heated by electricity that flows from the wheel 27 to the blade 29 to the wheel 28. The electricity is furnished by a variable transformer 41. Electric current flows from the transformer 41 to the arm 42, to the brush 43, to the disc 44 that is mounted on the wheel 27, to the wheel 27, through the blade 29, to the wheel 28, to the disc 45 that is mounted on the wheel 28, to the brush 46, to the arm 47, and back to the transformer 41.

The operation of heating the blade would be as follows. The heat required will depend on the width of the board to be sawn and the amount of moisture in the timber. The variable transformer 41 should be adjusted for this condition. The timber 48, shown in FIGURES 12 and 13, moves in the direction shown by arrow 49. The timber 48 contacts electric switch 50. Electric switch 50 operates relay 51. Relay 51 operates electric switch 52. Electric switch 52 causes electric current to flow in transformer 41. Electric current from the transformer 41 flows through the blade 29. When the timber passes over the electric switch 50 the switch 50 disconnects the transformer 41 and electricity stops flowing in the blade 29.

In using these blades the reader should realize there are many types of wood, some of which have more moisture than others, and some such as hardwoods have a greater density. In using the conventional saw different style teeth are used for different width boards, and other conditions that vary. The same will be true in using the blades described in this invention. Different conditions will require different size teeth in the blades.

In the above four new methods of cutting wood have been shown, which are sawing and forming the wood; slicing and forming the wood; heating, sawing and forming the wood; and heating, slicing, and forming the wood.

The method of sawing and forming the wood uses the blades illustrated in FIGURES 1, 2, 3, 4, and 10. In this process the saw teeth cut a kerf in the wood and the small forming teeth on the blade exert sufficient pressure on the kerfs sides to compress the wood. Compressing the wood increases the width of the kerf and provides clearance for the blade to move through the kerf at high speed with a minimum amount of friction. The compressing of the kerf reduces the amount of saw dust cut and makes the surface of the board more dense. By cutting less saw dust the gullets in the saw can be smaller, which will allow the saw teeth to be closer together and the blade thinner. The amount that the forming teeth compress the wood will depend on the specie cut and other sawing conditions. The present saw mill practice is to cut a kerf that is double or almost double the thickness of the blade. Using this blade, on some species, the forming teeth can compress the wood to provide the same clearance, or in some instances it will not be necessary to have as much clearance. It was explained that this saw has teeth that are closer together. A saw that has teeth closer together cuts a smoother kerf and does not require as much clearance. In conventional sawing practice a large amount of the cutting consists of breaking the chip away from the sides of the kerf. The breaking of the chip causes small pieces of wood to extend from the kerf and they act as a friction surface to hold the saw dust between the blade and the sides of the kerf. In this saw the forming teeth press these small pieces of wood down and provide a smoother surface for the saw dust to slide on when it is conveyed out of the kerf. In this way less clearance between the blade and the kerf is required. It was also stated in application Serial Number 70,493, filed November 21, 1960, now Patent No. 3,089,524, which describes how wood can be cut with less saw dust waste by bending the wood, that blades with forming teeth as described in this application can be combined with bending to reduce saw dust waste. It is therefore believed that by using smaller saw teeth, compressing the wood fibers that protrude from the sides of the kerf, having holes in the blade to carry out saw dust that lodges between the blade and the kerf, and bending the wood, will allow some species of wood to be cut with thinner blades than now used and with kerfs not over 25 percent thicker than the blade.

The method of slicing and forming wood uses the blades illustrated in FIGURES 5, 6, 7, 8, 9, and 11. In this process the knife shaped teeth slice the wood and the forming teeth compress the sides of the kerf and provide clearance for the blade. This process will cut less saw dust than when saw teeth are combined with forming teeth. It can be best used on very soft wood that has not been dried to remove the moisture content.

It can also be combined with bending the wood as described in application Serial Number 70,493, filed November 21, 1960.

The method of heating, sawing and forming combines heating the wood with the sawing and forming method that was described above. As has been explained heating the wood reduces the force required to cut and form the wood. Reducing the force required to cut and form the wood will allow using thinner blades. Thinner blades will cut less saw dust and in this way more lumber can be obtained from some species of wood.

The method of heating, slicing and forming combines heating the wood with the slicing and forming method that was described above. In this method the knife shaped teeth that slice the wood do a combined operation of cutting the wood and conducting heat into the wood. The forming teeth that follow the knife shaped teeth compress the wood easier because the wood has been heated. In this way harder wood can be cut by this process.

I claim:

A blade that will reduce the amount of saw dust cut in cutting one section of wood from another section of wood, comprising a blade that has cutting and forming teeth, said cutting teeth to be located on the edge of said blade, said forming teeth to be located each a short distance inwardly from the line that connects the tops of two adjacent cutting teeth, each said forming tooth having a sloping surface that compresses the sides of the kerf due to the forming tooth being thicker at its rear than at its front end, said forming tooth having its longitudinal dimension extending generally in the direction of cut with a slight angle to said line that connects the tops of two cutting teeth, the front part of said forming tooth being closer to said line than the back part of said tooth thereby causing said forming tooth to exert a force that will assist in pushing the cutting teeth into the wood.

References Cited in the file of this patent

UNITED STATES PATENTS

| 553,071 | Poindexter | Jan. 14, 1896 |
| 771,518 | Wilson | Oct. 4, 1904 |
| 807,647 | Weir | Dec. 19, 1905 |
| 964,602 | Aldridge | July 19, 1910 |
| 2,071,618 | Ferrari et al. | Feb. 23, 1937 |
| 2,778,394 | Schubert | Jan. 22, 1957 |
| 2,913,024 | Key | Nov. 17, 1959 |
| 2,972,669 | Brown | Feb. 21, 1961 |

FOREIGN PATENTS

| 1,747 | Great Britain | Jan. 30, 1891 |
| 187,974 | Germany | Sept. 4, 1907 |
| 141,107 | Switzerland | Sept. 16, 1930 |